United States Patent [19]

Bunsen

[11] Patent Number: 4,845,652

[45] Date of Patent: Jul. 4, 1989

[54] GENERIC EQUATION SOLVER INTERFACE FOR SOLVING MATHEMATICAL EQUATIONS

[75] Inventor: Christopher M. Bunsen, Corvallis, Oreg.

[73] Assignee: Hewlett-Packard Company, Palo Alto, Calif.

[21] Appl. No.: 868,404

[22] Filed: May 29, 1986

[51] Int. Cl.[4] .............................................. G06F 3/147
[52] U.S. Cl. ............................ 364/709.14; 364/710.08
[58] Field of Search ............ 364/709, 706, 710, 709.14, 364/710.08; 340/706, 711, 724, 720

[56] References Cited

U.S. PATENT DOCUMENTS

| | | | |
|---|---|---|---|
| 4,092,523 | 5/1978 | Tava et al. | 235/310 |
| 4,386,412 | 5/1983 | Ito | 364/709 X |
| 4,455,618 | 6/1984 | Walden et al. | 364/900 |
| 4,481,598 | 11/1984 | Ishiwata | 364/710 |
| 4,507,743 | 3/1985 | Haneda et al. | 364/709 |
| 4,554,641 | 11/1985 | Haneda et al. | 364/710 |
| 4,634,970 | 1/1987 | Payne et al. | 340/720 X |
| 4,647,911 | 3/1987 | Maegawa et al. | 340/365 R |
| 4,718,029 | 1/1988 | Morino et al. | 364/710.08 X |
| 4,774,684 | 9/1988 | Toyomura | 364/710.08 |

Primary Examiner—Gary V. Harkcom
Assistant Examiner—Tan V. Mai

[57] ABSTRACT

A user-to-calculating device interface for the solution of mathematical equations. The interface allows for the simple construction of equations which may be utilized or stored. Once an equation has been constructed, it may be solved. The preferred embodiment shows a device wherein equations may be solved utilizing an interface which utilizes a minimum number of key strokes. The user interface includes a top-row-keys interface, in which each menu key within a plurality of menu key are used to both store and to calculate a variable. If two labeled menu keys are pressed in succession, the machine calculates a result for the second. Otherwise, pressing a labeled menu key performs an assignment ("=") operation and then stores a number and displays the number in a display line as a variable represented by the menu key pressed. Pressing an unlabeled menu key does nothing.

16 Claims, 16 Drawing Sheets

LINE 1
LINE 2  DOLLARS=FRANCS/DTOF
LINE 3  >DOLLARS=POUNDS/DTOP
        CALC  EDIT  DELET

LINE 1
LINE 2
LINE 3  >DOLLARS=FRANCS/DTOF
        CALC  EDIT  DELET

LINE 1
LINE 2
LINE 3  >/f2D/f1OLLARS=FRANCS/DTOF
        CALC  EDIT  DELET

LINE 1
LINE 2
LINE 3  >EXCHANGE:/f2D/f1OLLARS=FRANC
        CALC  EDIT  DELET

GENERIC EQUATION SOLVER INTERFACE FOR SOLVING MATHEMATICAL EQUATIONS

BACKGROUND

Typically, in order to solve mathematical equations using calculating devices, it has been first necessary for a user of a calculating device to manipulate or reduce an equation or in some other way conform to a lengthy, often difficult means to prepare an equation before solving the equation using the calculating device. For these reasons, often the amount of effort, such as the number of key strokes required by a user to perform useful functions on a calculator, has been excessive.

There have been efforts to make calculating devices more friendly to users. For instance, one prior art solution allowed for the permanent assigning of keys to variables in a single mathematical equation. See General Purpose Calculator With Capability For Performing Interdisciplinary Business Calculations, Rodes et al., U.S. Patent Ser. No. 3,863,060, which is hereby incorporated by reference. Although the interface in Rodes et al. was efficient to use, there was no flexibility in the choice of mathematical equation. If more such equations were added to a calculating device severe problems with key density on the calculating device could result.

SUMMARY OF THE INVENTION

In accordance with the preferred embodiment of the present invention a user-to-calculating device interface for the solution of mathematical equations is set out. The interface allows for the simple construction of equations which may be utilized or stored.

Once an equation has been constructed, it may be solved. The preferred embodiment shows a device wherein equations may be solved utilizing a minimum key stroke interface. The user interface includes a top-row-keys interface, in which each menu key within a plurality of menu key are used to both store and to calculate a variable. If two labeled menu keys are pressed in succession, the machine calculates a result for the second. Otherwise, pressing a labeled menu key performs an assignment ("=") operation and then stores a number and displays the number in a display line as a variable represented by the menu key pressed. Pressing an unlabeled menu key does nothing.

BRIEF DESCRIPTION OF THE DRAWINGS

FIGS. 4–41 and FIGS. 42A, 42B, and 42C show various outputs on a display of the calculating device shown in FIG. 1.

DESCRIPTION OF THE PREFERRED EMBODIMENT

Figure 1:
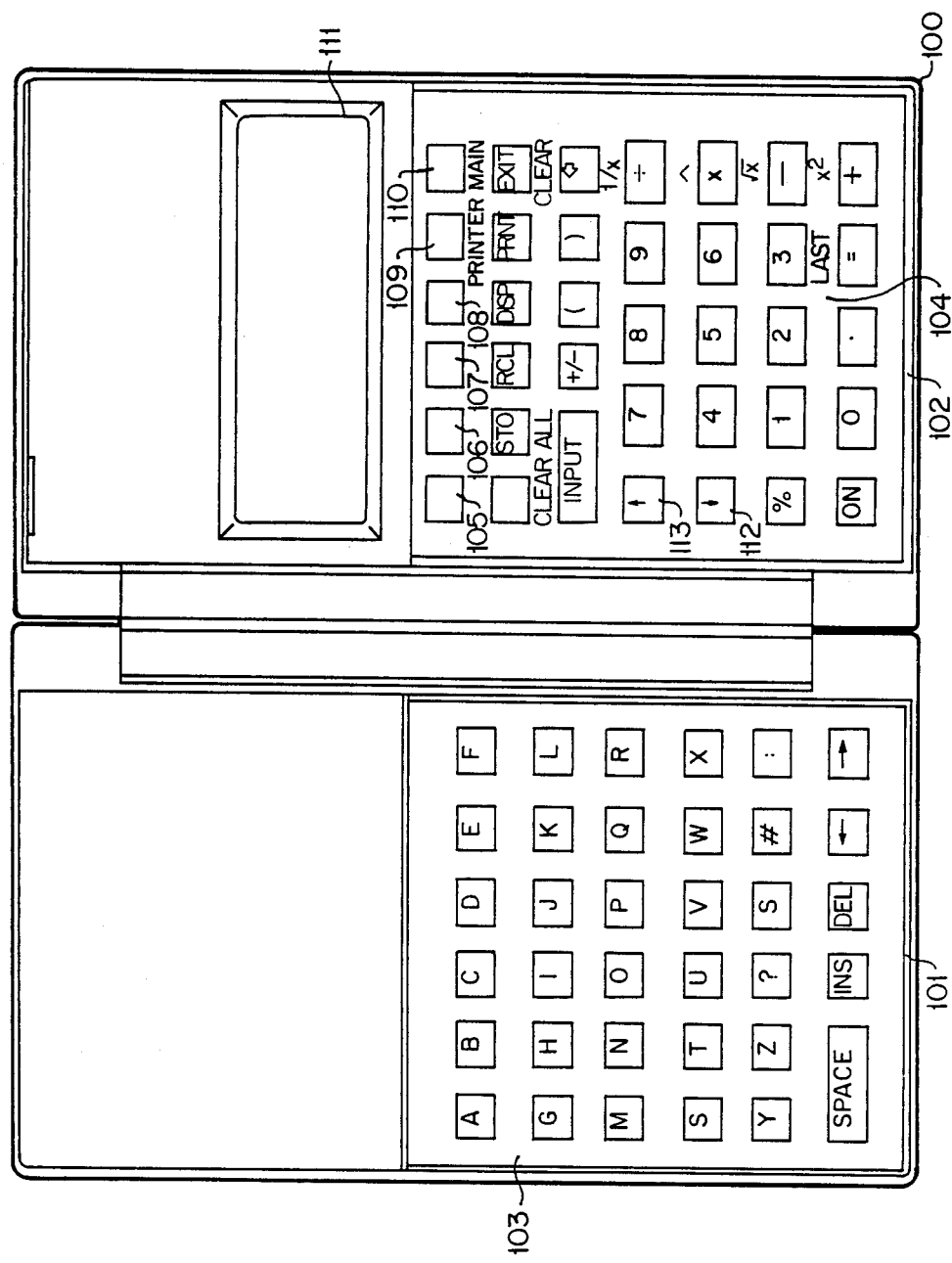
FIG. 1 shows the keyboard and display of a calculating device in accordance with a preferred embodiment of the present invention.

In FIG. 1, a calculating device 100 is shown having a first section 101 and a second section 102. First section 101 includes a plurality of keys 103 which include keys to be utilized for entering alphabetical symbols.

Second section 102 includes a display 111. In the preferred embodiment display 111 is a liquid-crystal display which displays four lines of twenty-three characters. Second section 102 also contains a plurality of keys 104, which include numeric keys and function keys as labelled. A scrolling key 112 and a scrolling key 113 are labelled as shown.

Additionally, second section 102 includes a multifunction key 105, a multifunction key 106, a multifunction key 107, a multifunction key 108, a multifunction key 109 and a multifunction key 110. Multifunction keys 105–110 are variable function keys which may have associated with them a function or the value of a variable. The term "key" is used generically to mean a means of entering data. For instance, the term key includes not only mechanical means of input but also may include entry of data through a touch sensitive screen.

Figure 3A:
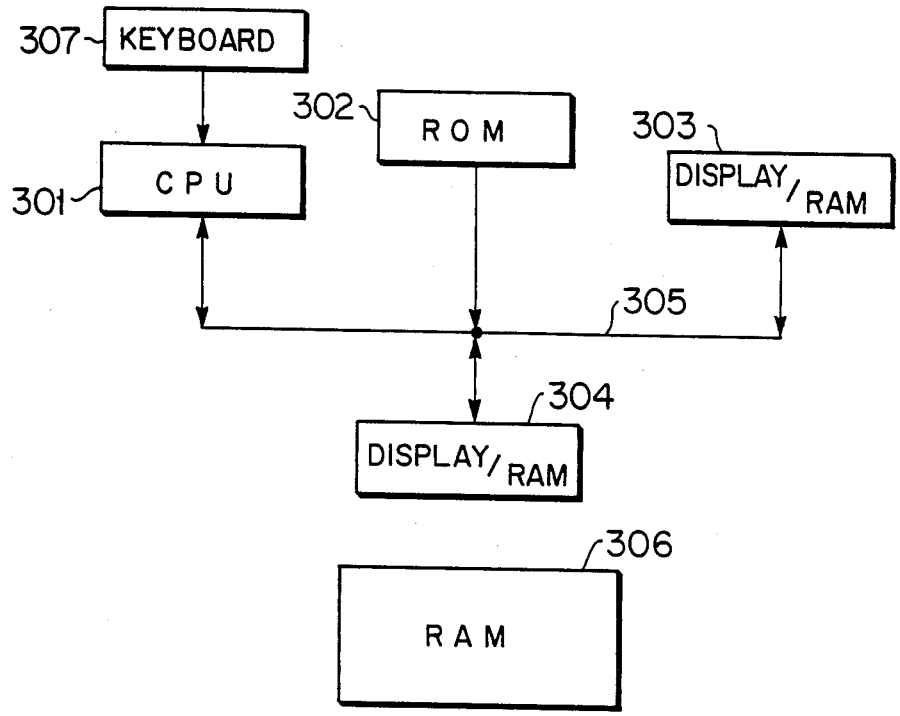
FIG. 3A shows the internal chip-level architecture of the calculating device shown in FIG. 1.

FIG. 3A shows the internal chip-level architecture of calculating device 100. A central processing unit (CPU) 301, a read only memory (ROM) 302, a combination display controller and a random access memory (Display/RAM) 303 and a Display/RAM 304 are shown coupled to a bus 305. A keyboard 307 is shown coupled to CPU 301. Keyboard 307 may include plurality of keys 103 and plurality of keys 104. A random access memory (RAM) 306 is also shown in FIG. 3A. RAM 306 is the total RAM from Display RAM 303 and Display RAM 304 which is available to be accessed by CPU 301.

Figure 3B:
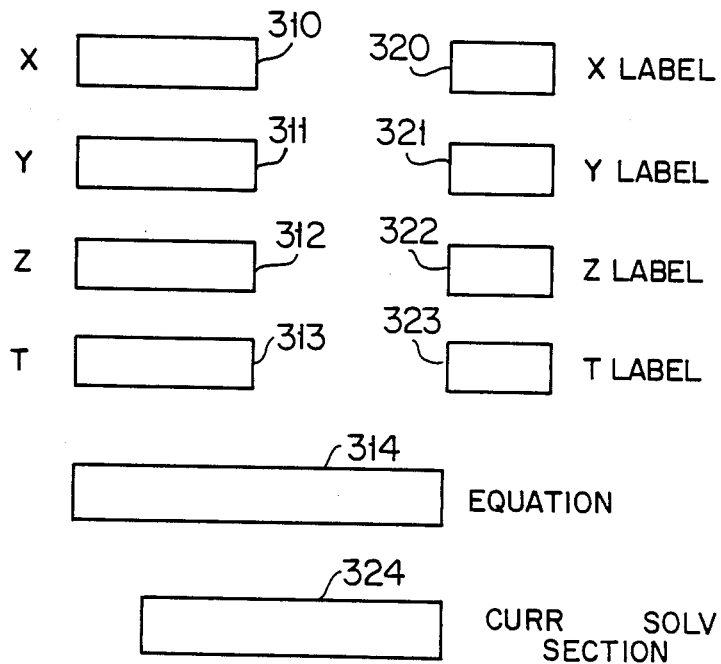
FIGS. 3B, and 3C show memory configuration of the calculating device shown in FIG. 1.

FIG. 3B shows a memory location 310, a memory location 311, a memory location 312, a memory location 313, a memory location 320, a memory location 321, a memory location 322, a memory location 323, a memory location 314 and a memory location 324. Memory locations 310–314 and 320–324 are permanently assigned memory locations within RAM 306. Memory locations 310–313 each contain 64-bit binary-encoded decimal numbers. Memory locations 314, and 320–324 each contain 20-bit addresses that point to other memory locations in RAM 306. Memory locations pointed to by memory locations 320–323 contain alphanumeric strings. Display 111 displays alphanumeric strings pointed to by memory locations 320–322 and 64-bit arithmetic numbers contained in memory locations 310–312. In display 111 the alphanumeric string pointed to by 320 (called "XLABEL") is displayed adjacent to the ASCII form of the number stored in memory location 310 (called "X"). Similarly, the alphanumeric string pointed to by 321 (called YLABEL") is displayed adjacent to the ASCII form of the number stored in memory location 311 (called "Y"), and the alphanumeric string pointed to by 322 (called "ZLABEL") is displayed adjacent to the ASCII form of the number stored in memory location 312 (called "Z").

X,Y, and Z with their associated labels are treated as a stack. Memory location 313 (called "T") and memory location 323 (called "TLABEL") are the top of the stack and are not displayed. X,Y,Z and T and their associated labels may contain the null set. FIG. 2C is a flowchart of a program for adding and deleting entries from the stack. Additional details about the stack performance is evident from the discussion below.

Memory location 314 and memory location 324 are also permanently assigned memory locations. Memory location 314 contains the null set or a 20-bit address of alphanumeric string which is used as a current equation, as explained below. Memory location 324 contains the null set or a twenty-bit address of a memory location containing the parsed version of the alphanumeric string pointed to by memory location 314, as explained below.

Figure 2A:
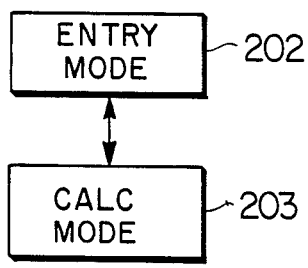
FIG. 2A is a block diagram of a program implementing an equation solving interface in accordance with the preferred embodiment of the present invention.

FIG. 2A is a block diagram of a program implementing an equation solving interface. The program can be in an entry mode 202 or a calculating mode 203. In entry mode 202 plurality of keys 103 and 104 can be used to enter a equation into calculating device 100. The equation is entered as an alphanumeric string pointed to by memory location 314. More discussion on exactly how to enter an equation and how an equation is displayed by display 111 is found below.

Once an equation has been entered into calculating device 100, a user may enter into calculation mode. The actual steps necessary for a user to perform are discussed more fully below. Calculating device 100 parses the equation displayed by display 111 in order to extract mathematical variables and to determine the mathematical relationship between the variables. Also, calculating device 100 verifies that the entered equation does define a legitimate mathematic relationship. A parsed version of the alphanumeric equation shown by display 111 is placed in a memory location pointed to by equation 324. Parsing is well-understood in the art, and a discussion thereof may be found, for instance in *Principles of Compiler Design,* Alfred V. Aho, Jeffrey D. Ullman, Addison-Wesley Publishing Company, 1977, esp. Chapters 3,4,5.

Figure 3C:
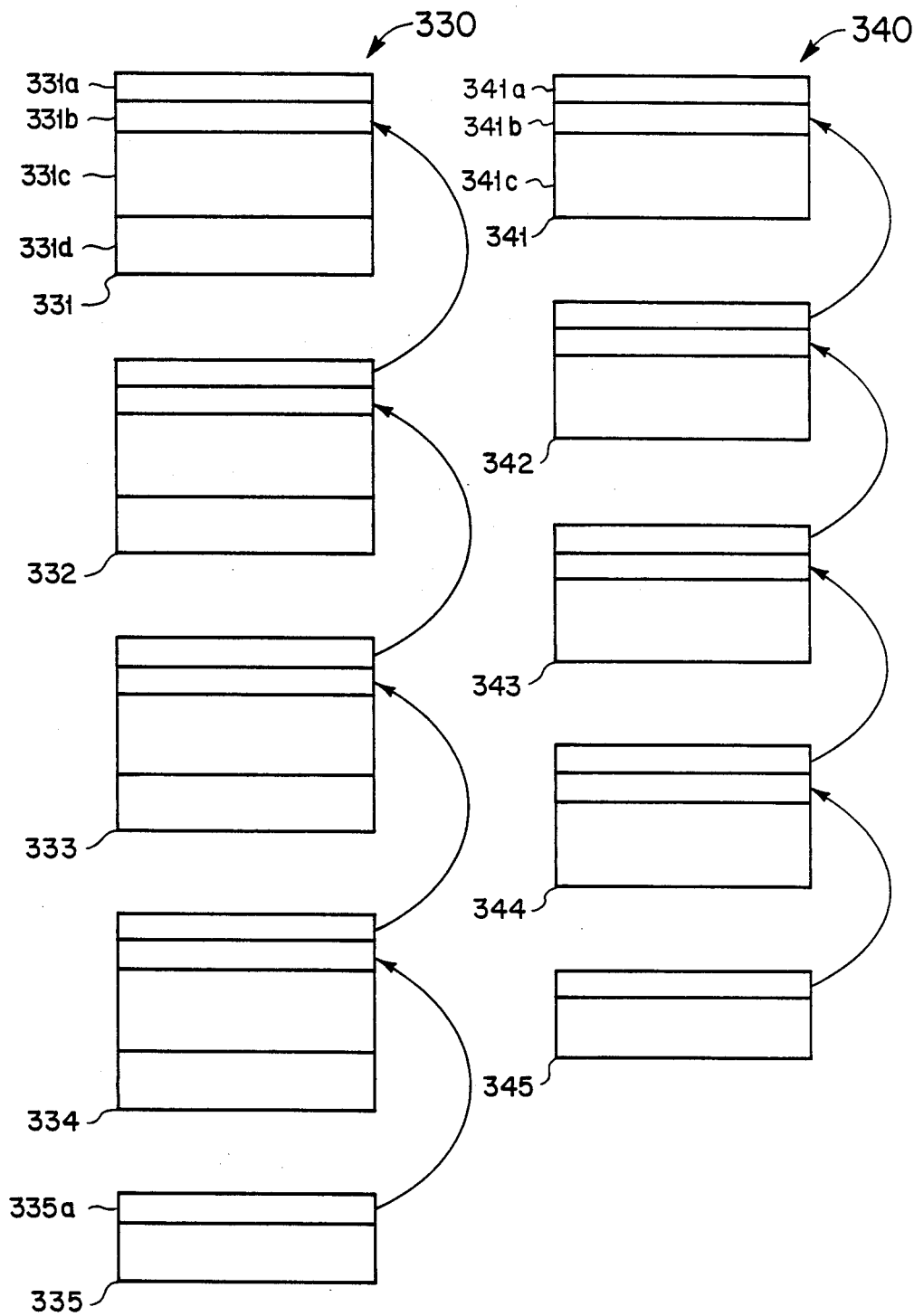

When parsing the equation, calculating device 100 extracts the variables and compares the variables to variables in a variable list 330 (sometimes referred to herein as "the variable list"), shown in FIG. 3C. Variable list 330 is a linked list in which each variable location includes a pointer to the next variable in the list. Variable list 330 resides in RAM 306. Variable list 330 is shown to have entries 331, 332, 333, 334 and top of list 335. Entry 331 is shown divided into four segments. A segment 331a contains a twenty-bit address of the next entry into variable list 330, or the null set if there is no next entry. A segment 331c contains an alphanumeric variable name. A segment 331b contains the length of the alphanumeric variable name contained in segment 331c. A segment 331d contains a 64-bit number representing the current value of the variable of entry 331. Entries 332-334 are formatted similarly to entry 331. Entry 335 is a top of stack pointer and contains a segment 335a which points to entry 334.

If after parsing, an equation is verified to be of appropriate format, the equation, in unparsed form, is placed in a formula list 340 (sometimes referred to herein as "the formula list") which stores equations. Formula list 340 is shown to have entries 341, 342, 343, 344 and top of list 345. Entry 341 is shown divided into three segments. A segment 341a contains a twenty-bit address of the next entry into formula list 340, or the null set if there is no next entry. A segment 341c contains the equation in unparced form. A segment 341b contains the length of the equation contained in segment 341c.

Once in calculating mode the equation to be calculated is displayed by display 111. Additionally, each variable of the equation is associated with one of the multifunction keys 105-110. For each variable associated with a multifunction key a label with the name of the variable appears on display 111 right above the multifunction key associated with the variable, as further described below.

Figure 2B:
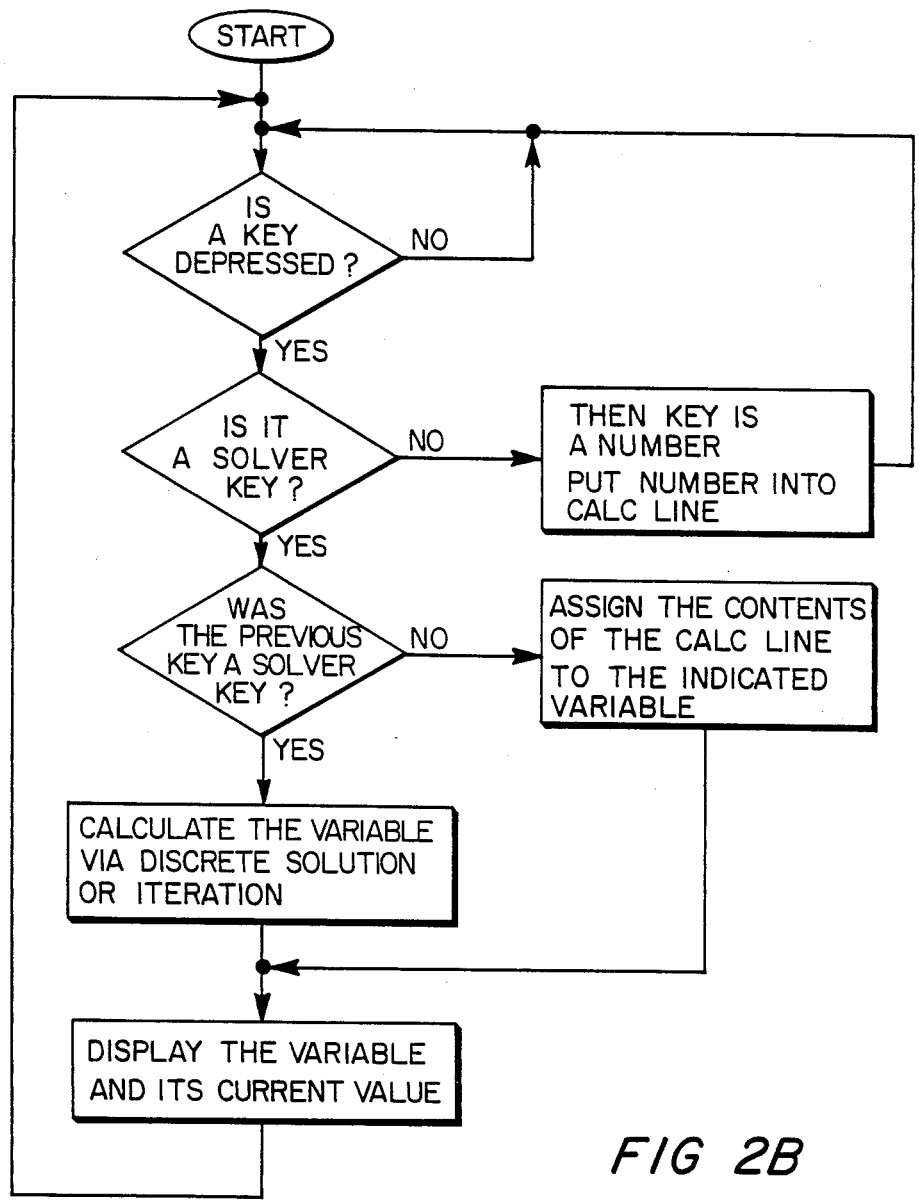
FIG. 2B is a flowchart of a program which implements the the calculating portion of the equation solving interface shown in FIG. 2A.
Figure 2C:
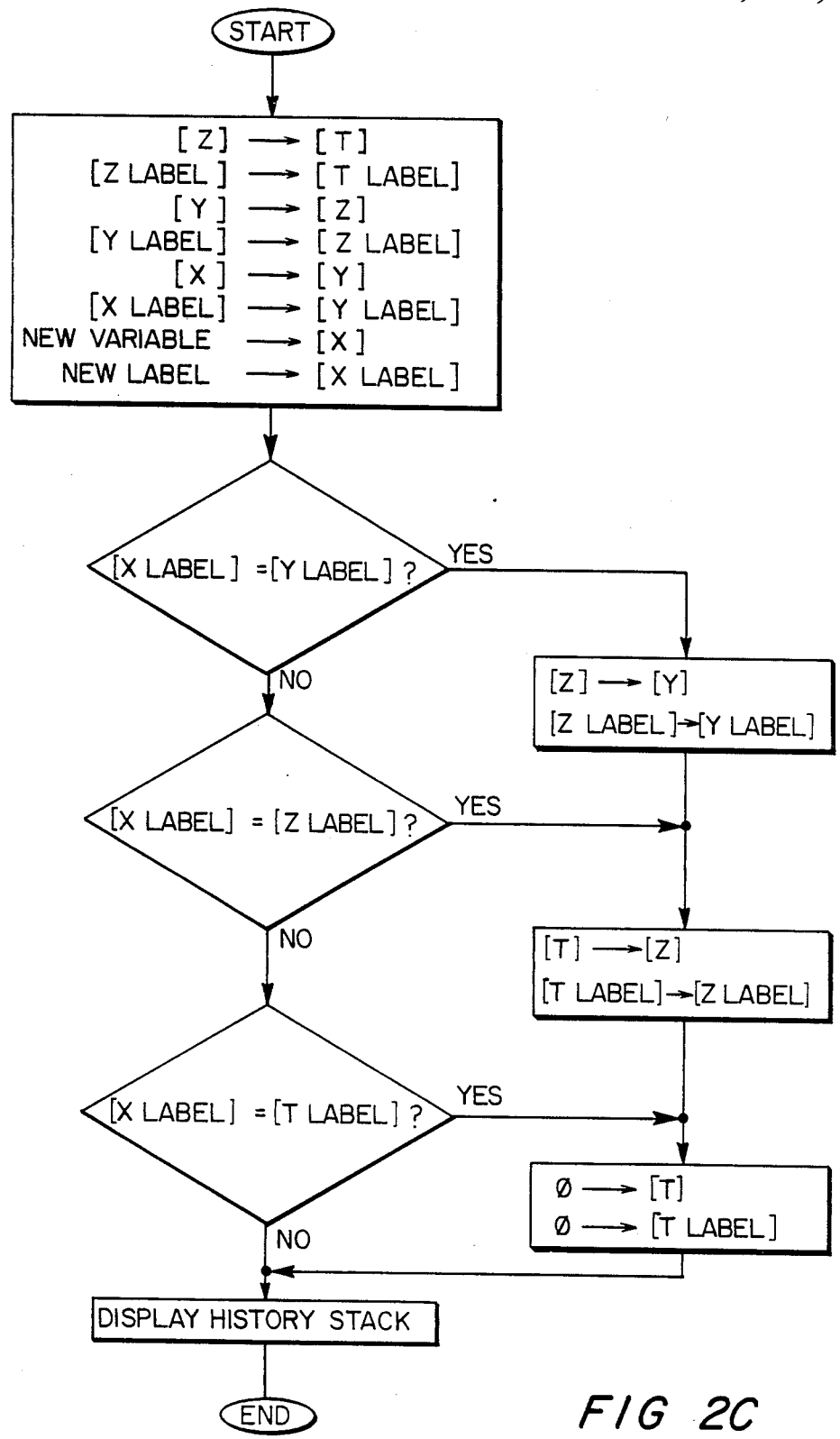
FIG. 2C is a flowchart of a program which shows how new values and their labels are added to a history stack.

Calculating device 100 when in calculating mode enters the programming loop described by the flowchart shown in FIG. 2B. A monitor loops until a key on calculating device 100 is depressed. Once a key is depressed calculating device 100 checks to see if it was one of multifunction keys 105-110. If the key depressed is not one of multifunction keys 105-110, calculator 100 enters the value, into a current calculate line, as described further below. The calculator then reenters the monitor loop.

If the key depressed is one of multifunction keys 105-110, calculator 100 checks to see whether the last prior key depressed was from multifunction keys 105-110. If the last prior key depressed was not from multifunction keys 105-110, the value in the calculator line is entered into a variable associated with the multifunction key depressed. The variable and its current value is then displayed.

If the last key depressed was from multifunction keys 105-110, the variable of the currently depressed multifunction key is calculated using the values of the other variables. The variable calculated and its current value is then displayed.

The following is a hands-on description of the interface which serves to illustrate the details of function of calculating device 100.

Figure 4:
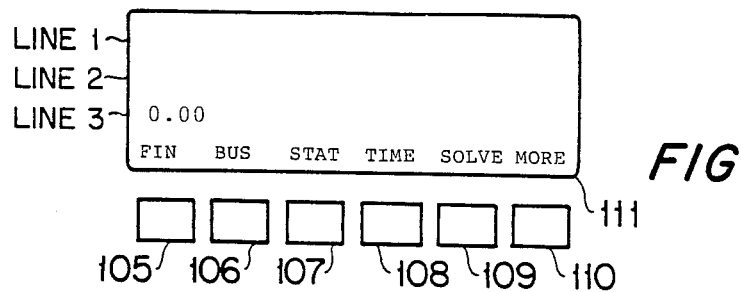

Display 111 is shown in FIG. 4. Calculating device 100 is in a condition such that no equations have been entered into formula list 340. In FIG. 4, display 111 shows the main menu of calculating device 110. Display 111 is set to round to two decimal places.

Figure 5:
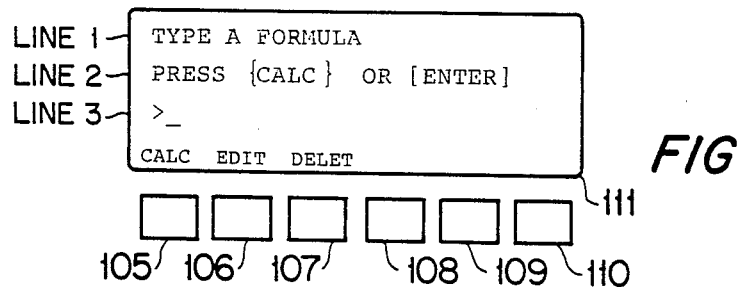

To enter the SOLVE application, press [(SOLVE)]. What is meant by "press [(SOLVE)]" is to press a multifunction key from multifunction keys 105-110 which is immediately below the label SOLVE in display 111. As shown in FIG. 4, this would mean depressing multifunction key 109.—In the following, a variable name surrounded by "[()]" means that the variable may be selected by depressing one of multifunction keys 105-110. A name surrounded by "[]" means that the function may be selected by depressing one of plurality of keys 103 or 104 which is thus labelled.—If there are no formulas in formula list 340 when you press [(SOLVE)], FIG. 5 shows what will be seen.

THE GENERAL PROCEDURE

The general procedure is given below:
o Type in a formula.
o Press [(CALC)] to calculate using the variables in the formula in the top-row-keys interface.
o Press [EXIT] to return to the SOLVE menu.
o Type in another formula.
o Press [(CALC)] to calculate using the second formula.
o And so forth . . .

PUTTING THE FIRST FORMULA INTO FORMULA LIST 340

Figure 6:
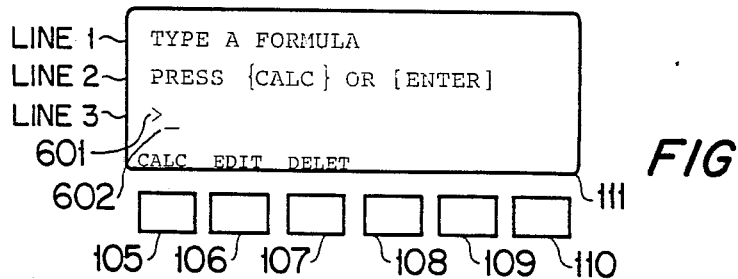

Suppose that display 111 is as shown in FIG. 6. The calculator line is in alphanumeric mode and the calculator history stack described in FIG. 3B is masked and can not be seen. A pointer (bold arrow) 601 points to the current formula. A cursor 602 is to the right of pointer 601, indicating the beginning of the formula that you will type in.

The [EXIT] key, shown labelled in FIG. 1, has either of two effects in the SOLVE menu if the cursor is on:
o If formula list 340 is empty, the main menu returns.
o If formula list 340 is not empty, the SOLVE menu remains, the edit line disappears, and the previous current formula returns as the current formula.

Let us presume that you wish to enter the following monetary conversion formula into formula list 340 and to calculate the number of French francs that are equivalent to $73.35 if the conversion rate is 9.68 French francs to 1 U.S. dollar.

Formula: DOLLARS=FRANCS/DTOF (DTOF is francs-to-dollar rate).

Figure 7:
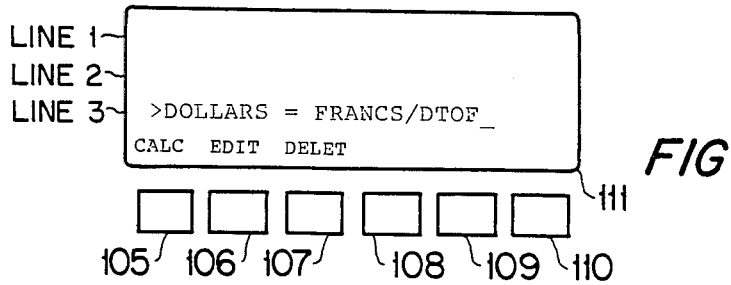

The procedure is to type in a formula and to press [(CALC)]. In this procedure, after you type in the formula completely, but before you press [(CALC)], display 111 will display as seen in FIG. 7. In this embodiment a variable name must begin with an alphabetic character and cannot contain the characters that are arithmetic operators.

If the formula is more than 22 characters long, the formula scrolls up to line 2, with the continuation in line 3, with no indentation.

You can uses spaces between variables and operators, but you can not put spaces within a variable name. Spaces in a valid formula are retained in formula list 340. There are no implied operators. Thus, A(B+1)=X is not valid

CALCULATING USING THE FORMULA

Figure 8:
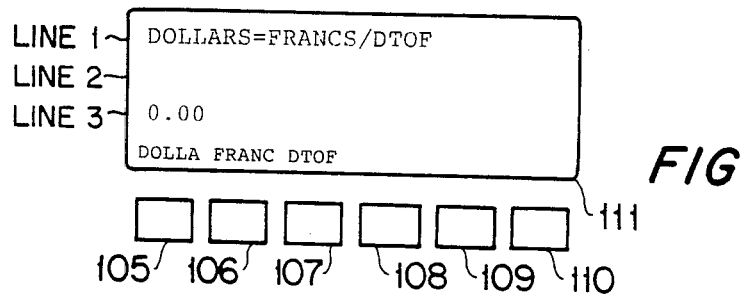

Now that you have completed typing in the formula, press [(CALC)] and display 111 will appear as shown in FIG. 8.

The formula is entered into formula list 340 and placed into line 1, indented one space. The calculator line is active. As you calculate and store numbers and the history stack lifts, the formula in line 1 disappears (see flowchart in FIG. 2C).

Variable in the formula that do not already exist are created and initialized to zero. The variables will exist in variable list 330 and consume space in RAM 306 until the variables are deleted using either the [(delete)] or [shift] [CLEAR ALL] keys.

Having pressed [(CALC)], the menu key labels display the first four or five characters of the variable names in the formula, depending on the characters used, in the order in which they appear in the formula. You are now able to calculate using these menu keys.

While the formula is being interpreted after you press [(CALC)], display 111 displays the message "VERIFYING FORMULA" in line 1.

If the formula is not valid, the error message "INVALID FORMULA" is displayed and the cursor is placed over the character that is detected as causing the error. You can edit the formula to correct it. If there is more than one error in the formula, the errors are detected one at a time, as you correct them and press [(CALC)].

Figure 9:
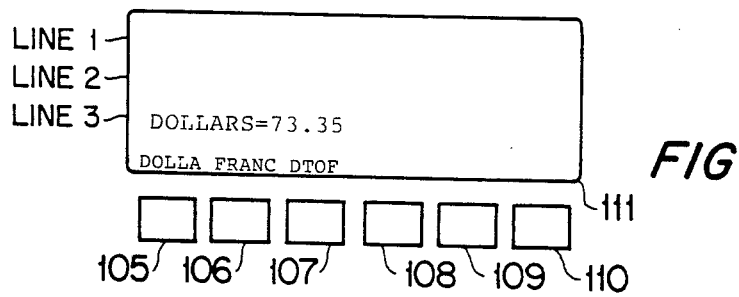

To calculate the answer to the example above, key in 73.35 and press [(DOLLA)] and display 111 will appear as shown in FIG. 9.

The three lines again display the stack and the formula is no longer displayed.

Figure 10:
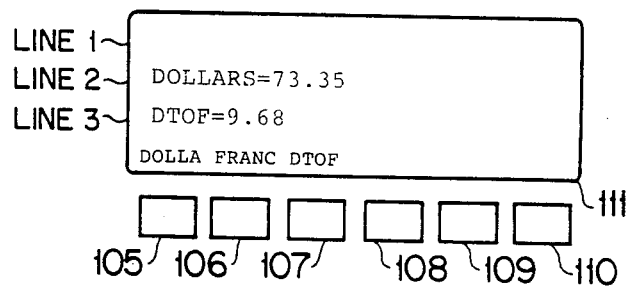

Key in 9.68 and press [(DTOF)] and display 111 will appear as shown in FIG. 10.

Figure 11:
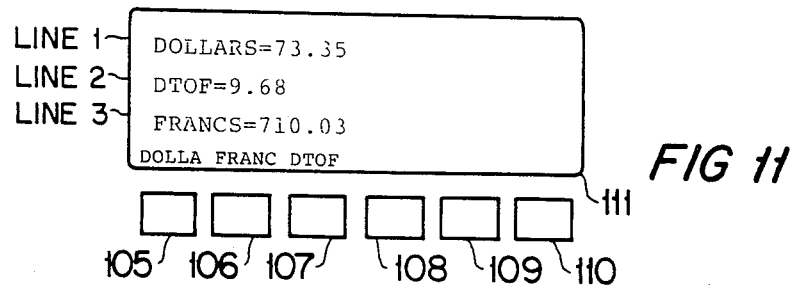

To solve for the number of French francs, press [(FRANC)] and display 111 will appear as shown in FIG. 11.

The calculator solves for the variable FRANCS and displays the answer. While it is solving for a variable, you will see "CALCULATING . . . " in line 1.

Figure 12:
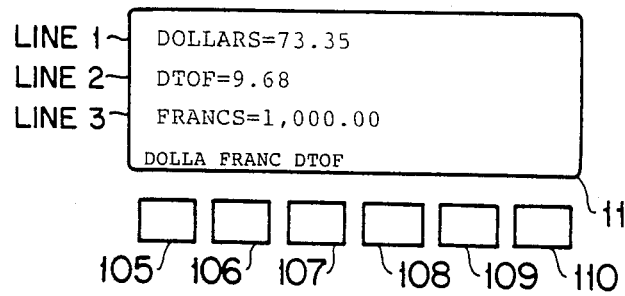

If the price of a sweater is 1000 francs, you can easily calculate the equivalent in U.S. dollars. Directly from the previous display, key in 1000 and press [(FRANC)] and display 111 will appear as shown in FIG. 12.

Figure 13:
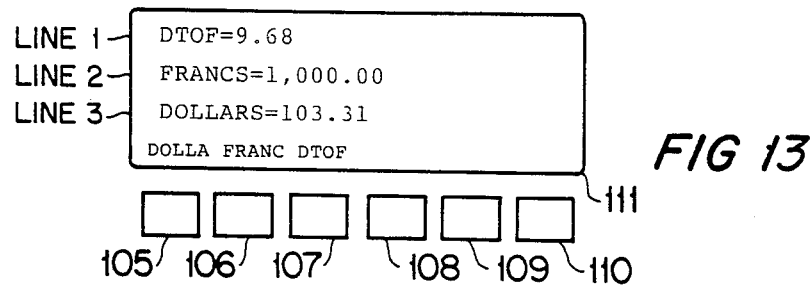

Then press [(DOLLA)] and display 111 will appear as shown in FIG. 13.

You can press [shift] [MAIN] to leave SOLVE and return to the main menu. The history stack would still be displayed as seen above, but the menu keys would show the main menu labels.

You can also press [EXIT] to return to the SOLVE menu so that other formulas can be typed into formula list 340.

In either case, the numbers that are now stored in the machine as values for DOLLARS, FRANCS, and DTOF are retained in memory for you to use when you return to this formula in SOLVE. The values for the variables will default to zero if you change the formula.

Although it is not necessary for you to do so, if you wish to clear the values for these variables to zeroes, press [shift] [CLEAR ALL] at any time you are in the CALC menu.

The present embodiment returns solution using both numeric and symbolic methods. Future embodiments still being developed will utilize the symbolic method to return not only a value, but other types of data as well.

PUTTING ADDITIONAL FORMULAS INTO THE FORMULA LIST

It is quite easy to put additional formulas into formula list 340 following the formula that you are working on. Suppose that you wish to put in two additional formulas: DOLLARS=LIRE/DTOL for conversion between U.S. dollars and Italian lire, and DOLLARS=POUNDS/DTOP for conversions between U.S. dollars and British pounds.

Figure 14:
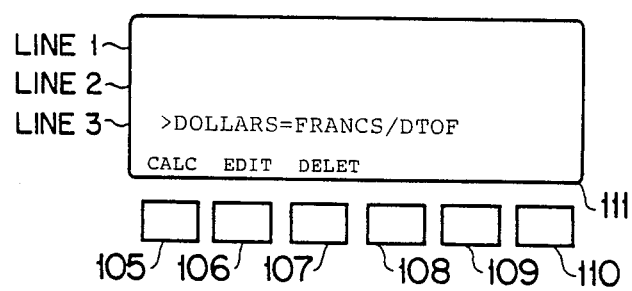

To do so, press [EXIT] to return to the SOLVE menu. Display 111 will appear as shown in FIG. 14.

This display again masks the calculator history stack you saw in the CALC display previously.

The bold arrow pointing at the dollars/francs conversion formula indicates that it is the current formula in formula list 340. This display indicates that the current formula is at the top of formula list because there is no other formula shown above it in display 111; lines 1 and 2 are blank. (We will see something there after we type in other formulas).

If you press [shift] [CLEAR ALL] with this display, you get a display that shows two options concerning clearing formula list 340.

Figure 15:
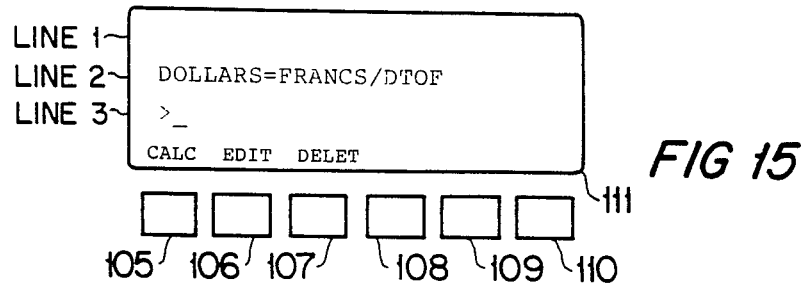

Press [v] (labelled as key 112 in FIG. 1) and display 111 will appear as shown in FIG. 15.

This display indicates that the dollars/francs formula is also the last formula in formula list 340, since there is no current formula (no bold arrow pointing at a formula) and the cursor is blinking at the left of line 3, indented one space.

If you were to press [(CALC)] with the blank line at the pointer, nothing happens.

Figure 16:
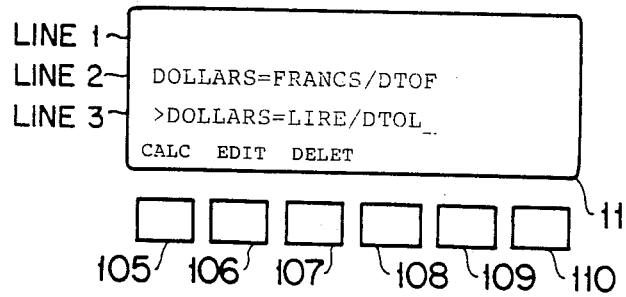

With the blinking cursor in this position, you can begin typing in a formula as the next formula in formula list 340. Display 111 as shown in FIG. 16 shows what you will see if you now type in the dollars/lire conversion formula.

Figure 17:
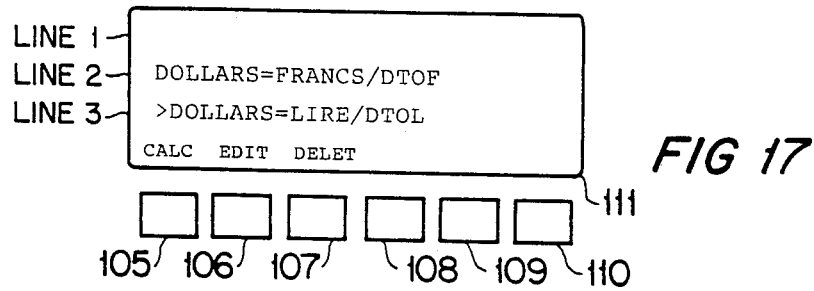

You can now press [(CALC)] and calculate using the formula. However, let us enter the formula without calculating so that a third formula can be typed in. To do after you type the second formula, press [INPUT], which enters the formula into formula list 340 but does not go to the CALC menu, as does [(CALC)]. So, press [INPUT] and display 111 will appear as shown in FIG. 17.

Now you see the first formula in line 2 and the second formula as the current formula in line 3.

The bold arrow is a pointer to the current formula; the pointer stays in line 3. The other lines are a window over the preceding two formulas in formula list 340. At this time there is only one other formula, thus line 1 is blank.

Figure 18:
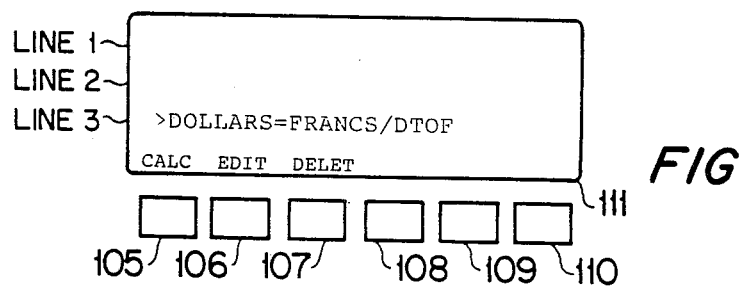

Since dollar/lire formula is the last formula in formula list 340, you could press [ ↓ ] to move the pointer from the current formula to add the third formula to the end of formula list 340. However, in order to demonstrate the automatic insert feature of the SOLVE enter/edit mode, press [ ↑ ] (labelled as key 113 in FIG. 1) to make the first formula the current formula. Display 111 will appear as shown in FIG. 18.

Now the first formula is the current formula and the menu keys would show its variables if [(CALC)] were pressed.

We know also that the second formula is below it in formula list 340, but it is not seen.

We have the dollars/pounds conversion formula to put into formula list 340. Let us suppose that, rather than putting it at the bottom of formula list 340, we wish to insert it between the dollars/francs and the dollars/lire formulas now in formula list 340. To do so with display 111 as shown in FIG. 18, merely start typing!

Figure 19:
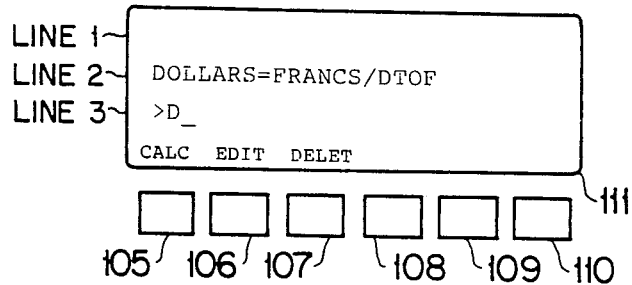

Type the first character, [D], and display 111 will appear as shown in FIG. 19.

The current formula automatically moves up to line 2, the character you typed appears at the left of line 3, and the blinking cursor is to its right. You are typing the formula in and it will be placed between the two formulas now in formula list 340—automatically. Complete the typing of the formula and press [INPUT] or [(CALC)]. The formula will be entered and become the current formula.

Figure 20:
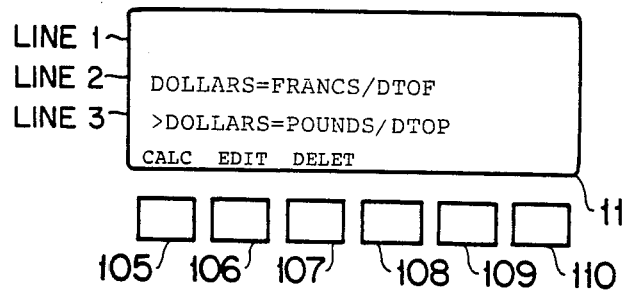

If you finish typing the dollars/pounds formula and press [INPUT], display 111 will appear as shown in FIG. 20.

Figure 21:
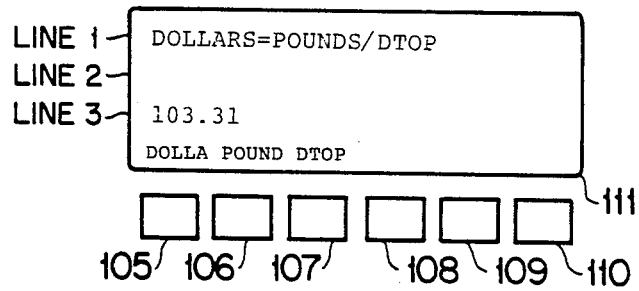

If you had pressed [(CALC)] before pressing [INPUT], or if you press [(CALC)] now, display 111 will appear as shown in FIG. 21.

The variables in the current formula appear as the menu keys, the calculator history stack returns with the current formula in line 1, and the previous contents of the calculator line return undisturbed.

In CALC mode, the [ ↑ ] and [ ↓ ] keys roll the history stack. If you wish to change formulas, press [EXIT] to return to the SOLVE menu. In that menu, the [ ↑ ] and [ ↓ ] keys move up and down in formula list 340.

Figure 22:
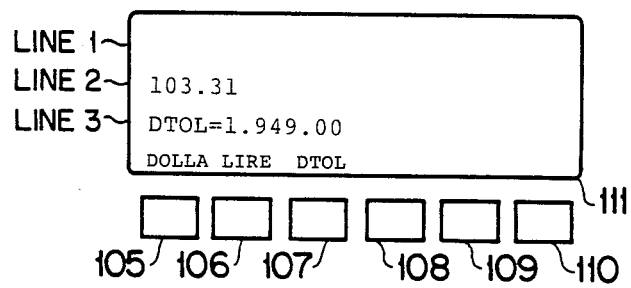

If you move to another formula, the formulas share variables of the same name. Thus, the three conversion formulas in formula list 340 share the variable named DOLLARS. In the present example dollars has the value 103.31. Suppose that the dollars/lire formula is the current formula in CALC mode and the variables in the dollars/francs formula have not been cleared. If the conversion of lire to dollars is 1949 lire to $1, you can calculate the lire equivalent to $103.31 at this time by keying in 1949 and pressing [(DTOL)] and display 111 will appear as shown in FIG. 22.

Figure 23:
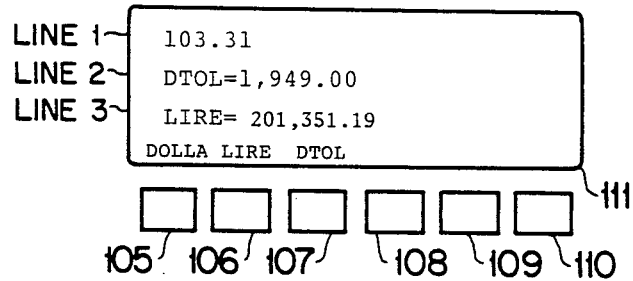

Then pressing [(LIRE)], and display 111 will appear as shown in FIG. 23.

Figure 24:
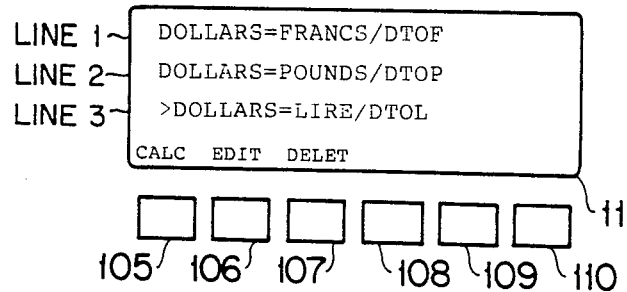

Press [EXIT] to return to the SOLVE menu and display 111 will appear as shown in FIG. 24.

The dollars/lire conversion formula is shown as the current formula and the other two formulas in formula list 340 at this time are shown above it. You can immediately begin typing another formula (which would be inserted after the current formula), or press [ ↓ ] to find the bottom of formula list 340. If you press [shift] [ ↓ ] the pointer will be placed just past the last formula in formula list 340. You could also press [(CALC)] again to continue calculating with the current formula.

The method for finding a solution for a variable is complicated and is discussed in the section "NUMERICAL METHOD SOLUTIONS IN [(CALC)] MODE".

You could press either of the other two menu keys in the SOLVE menu. The remainder of this chapter explains the features of these keys.

The following is a brief description of the function of each of the menu keys:

CALC—brings up the current formula variables as menu keys for calculation.

EDIT—puts the current formula into edit mode.

DELET—deletes the current formula (no insert is needed, since it is automatic; see the previous section).

DELETING A FORMULA, THE [(DELET)] KEY

Formulas may be selectively deleted using the [(DELET)] menu key.

Figure 25:
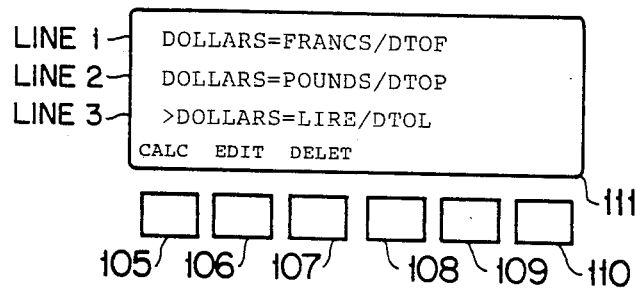

Suppose display 111 is as shown in FIG. 25.

Figure 26:
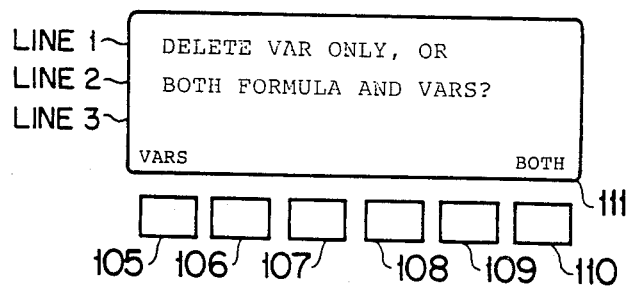

To delete the current formula, the formula indicated by the bold arrow, from formula list 340, press [(DELET)] and display 111 will appear as shown in FIG. 26.

Press [EXIT] to return to the previous display.

If you press [(VARS)], the variables in the current formula are deleted from variable list 330, thus freeing space in RAM 306. The formula itself is retained in formula list 340. If you press [(BOTH)], the formula and the variables in the formula are deleted. It is not possible to delete just the formula and retain the variables. When a formula is deleted formula list 340 of formulas move up from below to fill the gap in formula list 340. If the formula that is deleted is the last formula in formula list 340, the formula is deleted and formula list 340 moves down. This displays the new "last" formula as the current formula.

EDITING A FORMULA, THE [(EDIT)] MENU KEY

Figure 27:
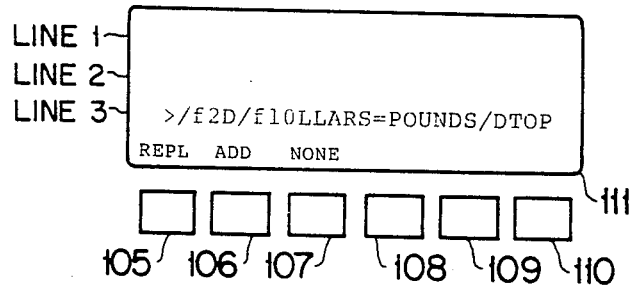

The [(EDIT)] menu key permits you to edit the current formula. Once it is edited, press [INPUT] or [(CALC)] as before. The edited formula is read and replaces the old version of the formula in formula list 340. [(EDIT)] is your access to the entire formula for review and editing, since the appearance of the formula in line 3 is usually only the first 22 characters. If you press [(EDIT)] display 111 will appear as shown in FIG. 27.

The cursor blinks over the first character to the left and the formula can be typed over. The edit keys [INS],

[DEL], [←], and [→] are active for editing the formula. If the formula is longer than 22 characters, the first 22 characters appear in lines 1 or 2, depending on the length of the formula, and editing can take place in all three lines of the display. See the section "LONG FORMULAS IN THE DISPLAY" near the end of this chapter for description of this feature.

If you press [(EDIT)] or [(DELET)] in SOLVE while you are editing a formula, there is a beep and nothing else happens.

NAMING A FORMULA FOR EASY VISUAL REFERENCE IN THE LIST

You can type in any string of characters that follow the rules below, end the string with a colon (:) and begin typing your formula. This string becomes the name of the formula for visual reference to the formula in the list. The name can be any string of characters except that although there can be leading and trailing spaces, the name cannot have spaces within it, the characters +, −, *, /, , <, >, =, (, ), and : can not be used in the name.

You can type in a name as you originally type in the formula, or you can edit an existing formula to put a name at the front of the formula.

Suppose display 111 is as shown in FIG. 28 and you wish to put the name EXCHANGE at the front of the first conversion formula.

Move the dollars/francs formula to the current position by pressing [↑] and display 111 will appear as shown in FIG. 29.

Press [(EDIT)] and display 111 will appear as shown in FIG. 30.

Press [INS] nine times (the number of characters in the word EXCHANGE plus one character position for the colon) and type EXCHANGE: and display 111 will appear as shown in FIG. 31.

Figure 32:
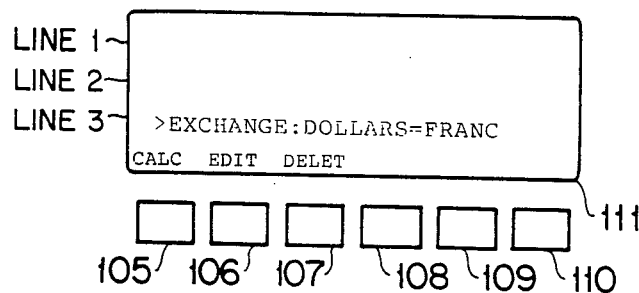

Then press [INPUT] and display 111 will appear as shown in FIG. 32.

When you move the pointer up and down in formula list 340, the word EXCHANGE will appear whenever this formula is in the display. The name does not affect the formula that you have typed in. You are permitted to have duplicate names for formulas and Champion does not distinguish between them. They are visual references only.

CLEARING THE FORMULA LIST

If the display is showing the SOLVE menu and formulas, you can clear the formulas from formula list 340.

Figure 33:
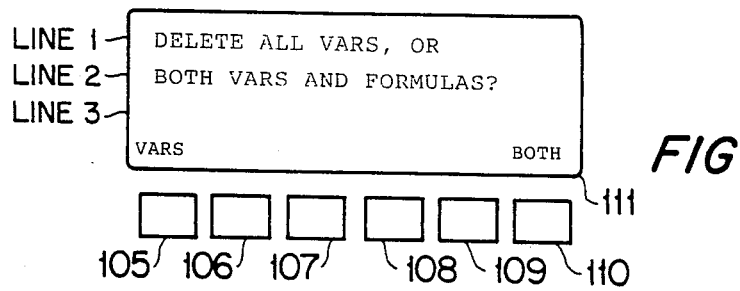

Press [shift] [CLEAR ALL] and display 111 will appear as shown in FIG. 33.

Press [EXIT] to return to the previous display. If you press [(VARS)], the space in RAM 306 used to store values for the variables in all of the formulas is freed for other uses. However, the formulas remain intact in formula list 340. If you press [(BOTH)], all of the formulas in formula list 340 and all variables in variable list 330 are deleted.

OPERATORS AND FUNCTIONS THAT THE FORMULA SOLVER UNDERSTANDS

The following is a list of the operators and functions that can be included in formulas in the SOLVE application:

+: addition
−: subtraction
*: multiplication
/: division
exponentiation
(: left parenthesis
): right parenthesis
=: equals
PI: the constant pi to 12 places
LOG(x): log base 10
ALOG(x): inverse log base 10
LN(x): natural log
EXP(x): inverse natural log
SQRT(x): square root
IP(x): integer part
FP(x): fractional part
RND(x:y): round x to y places
TRN(x:y): truncate x to y places
MAX(x:y): maximum of either x or y
MIN(x:n): minimum of either x or n
ABS(x): absolute value
DDAYS(d1:d2:c): days between dates, d1 and d2 valid date in current date format, c=1 (actual calendar) or 2 (360 day calendar) or 3 (365 day calendar)
DATE(d1:n): actual calendar date in current date format, d1 in current date format, n an integer
LNP1(x): ln(1+x)
FACT(x): factorial of positive integers
EXPM1(x): e x−1
SPFV(i:n): (1+i) n, i is %
SPPV(i:n): 1/SPFV(i:n), i is %
USFV(i:n): (SPFV(i:n)−1)/i, i is % USPV(i:n): USFV(i:n)/SPFV(i:n), i is %
INT(x): greatest integer less than or equal to x
MOD(x:y): x reduced modulo y, that is x-y*INT(x/y)
IF(logical expression:x:y): (see "SOLVER SYNTAX" section) with logical operators NOT, AND, OR, XOR If you type in a function that does not exist or is not specified as required by the syntax, display 111 displays "INVALID FORMULA".

NAMING VARIABLES AND RESERVED WORDS

A variable name must start with an alphabetic character. The remainder may be any combination of characters available on the machine except the space, (, ), <, >, , multiply, divide, +, −, :, and =. If these characters are used, the machine interprets them as operators rather than part of the variable name. A space in a variable name separates the string into two strings, which will cause "INVALID FORMULA" to be displayed. If the number of characters in a variable name is greater than ten characters or the name that you type is not valid, the error message "INVALID FORMULA" is displayed.

The letter combinations IF, NOT, AND, OR, XOR, and PI can not be used as a variable name, as they are reserved for their context as an advanced function (see formula list 340 above). If you type CAKE=PI+FLOUR+EGGS−FILLING as a formula, the variables will be CAKE, FLOUR, EGGS, and FILLING and a constant 3.14 ... However, letters IF and PI can be used as a part of a variable name, such as SIFT and PIE.

LONG FORMULAS IN THE DISPLAY

Some formulas will exceed the length of one line of the display. There are three cases:

The formula is in the display when the SOLVE menu is in the display, but the cursor is not present.

A formula is being typed in or edited, that is, when the SOLVE menu is present and the cursor is present.

The case in which the formula is displayed in CALC mode.

They will be discussed in order.

Suppose that the following formula is in formula list 340:

PROFIT=(PRICE-VARIABLECOST)*UNITS-FIXEDCOST

Figure 34:
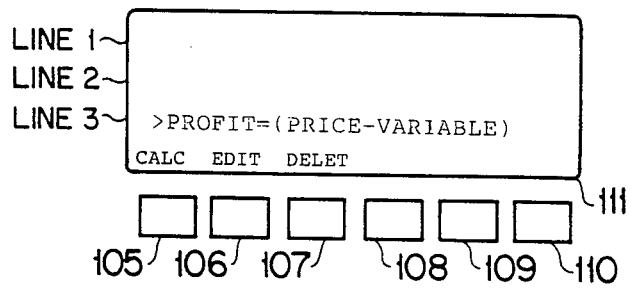

Suppose that it is the only formula in formula list 340 and is the current formula. If you press solve display 111 will appear as shown in FIG. 34.

Figure 35:
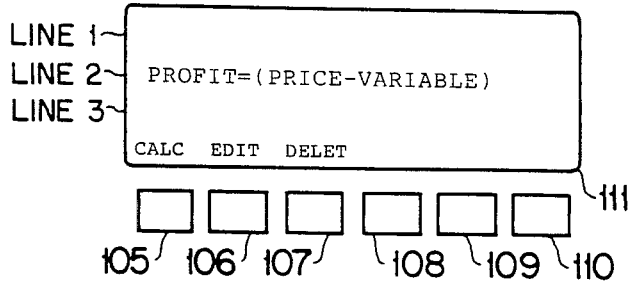

If you press [ ↓ ] you display 111 will appear as shown in FIG. 35.

Figure 36:
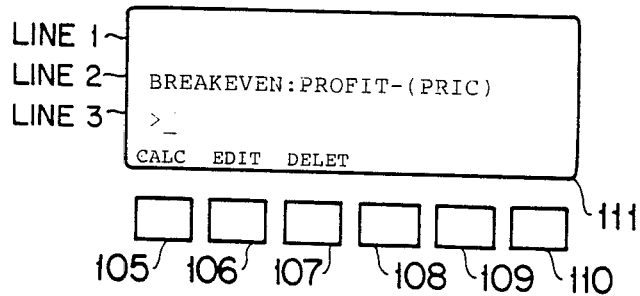

If the formula had the name BREAKEVEN, display 111 would appear as shown in FIG. 36.

When the SOLVE menu is in the display and the current formula is not in edit mode, you see only the first 22 characters of the formula. You are not able to access the portion of the formula to the right.

The second case appears to have two subcases: typing in the formula the first time and editing it after it is entered.

Suppose that the display is the one above and that you wish to type in the following formula:

TOTALCOST=LENGTH*WIDTH*HEIGHT/1-2*UNITCOST*(1+MARKUP%/100)

Figure 37:
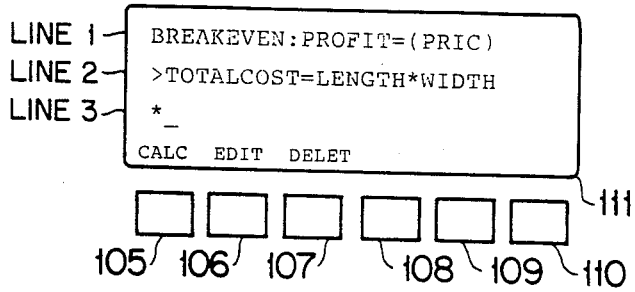

Type to the first character past the end of the first line and display 111 will appear as shown in FIG. 37.

Figure 38:
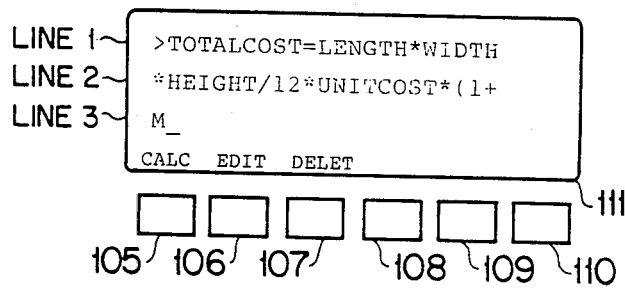

Continue typing to the first character past the end of this new line display will appear as shown in FIG. 38.

Figure 39:
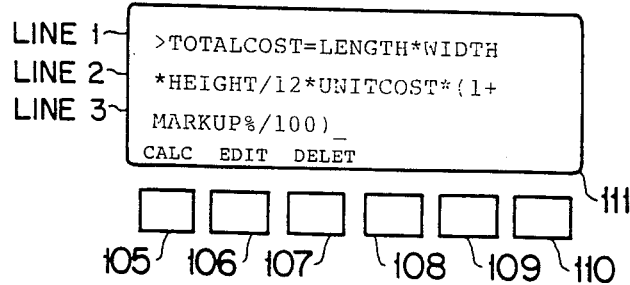

Continue typing the rest of the formula display 111 will appear as shown in FIG. 39.

Figure 40:
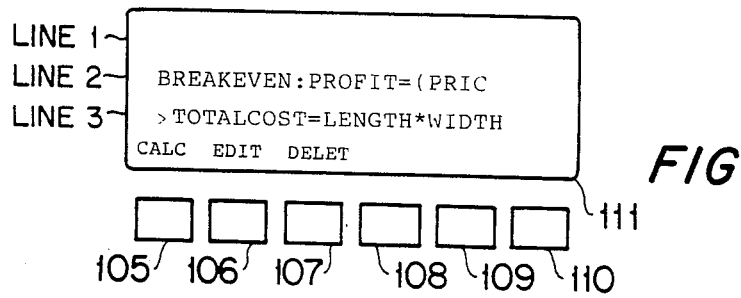

When you press [INPUT] display 111 will appear as shown in FIG. 40.

Two formulas are now in formula list 340.

If you press [(EDIT)] for this long formula it appears in edit mode using as much of the display as necessary to show up to the first three lines of the formula. If there are fewer than 22 characters, it will appear in line 3; if 23 through 45, it will appear in lines 2 and 3 (with the pointer in line 2); if greater than 45, it will appear beginning in line 1.

Figure 41:
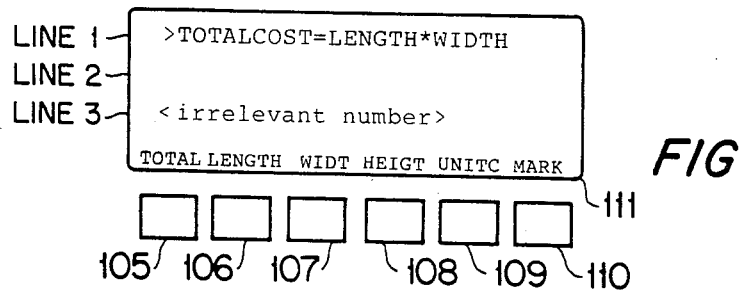

The third case is the long formula in CALC mode. Press [(CALC)] in the display above display 111 will appear as shown in FIG. 41

When you enter CALC mode the first 22 characters of the current formula are placed in line 1. The display is the history stack and the portion of the formula that you see will disappear when there is a stack lift.

MORE THAN SIX VARIABLES IN A FORMULA

Figure 42A:
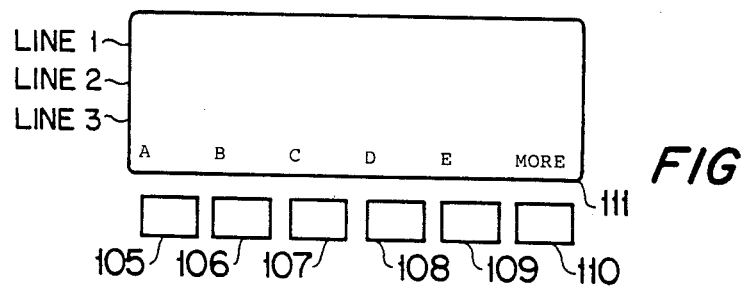
Figure 42B:
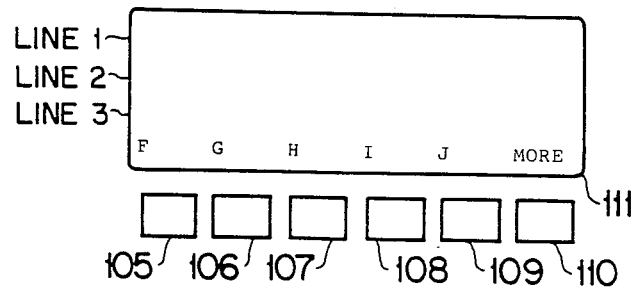
Figure 42C:
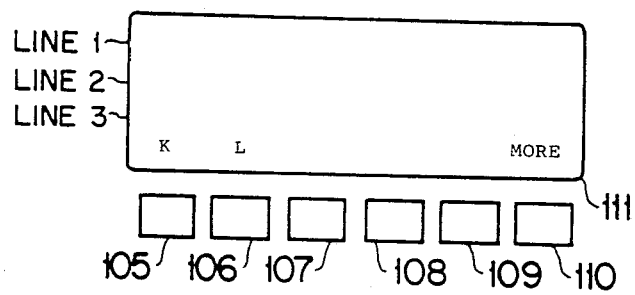

If there are moe than six variables in a formula the menu keys in [(CALC)] show sets of five variables and a sixth labeled [(MORE)]. If the formula is A+B+C+-D+E+F+G+H+I+K=L, the three sets of menu keys look as shown in FIGS. 42A, 42B and 42C.

Press [(MORE)] in any of the three and the next menu in the sequence is displayed. Press [EXIT] while any of the three menus is displayed and the SOLVE menu returns. Pressing [(CALC)] always brings up the first in the set.

HOW SOLVE WORKS

The solver has two ways of finding an answer. First, the solver tries to find a direct solution by "isolating" the user-variable you are solving for (frequently called the "unknown"). Isolating a variable involves rearranging the formula so that the unknown is by itself on the left-hand side of the formula. For example, if you enter the formula:

PROFIT=PRICE−COST and solve for COST (COST is the unknown), the solver uses rules of algebra to rearrange the formula to:

COST=PRICE−PROFIT

Then the solver takes the values you entered for PRICE and PROFIT and calculates COST using the rearranged formula. Answers calculated this way are called direct solutions.

For certain formulas, the unknown can be isolated, but an answer cannot be calculated with the values you store. Then, display 111 displays:

SOLUTION NOT FOUND

For example, if you enter a formula:

AREA=L×W and then enter 17 for AREA and 0 for W, the solver rearranges the formula to:

L=AREA/W in order to calculate L. However, since you entered the value 0 for W, the solver cannot find an answer because division by zero is not allowed.

The solver can isolate the unknown variable if your formula meets these conditions:

The unknown variable occurs only once in the formula.

The only operators involving the unknown variable are +, −, ×, /, and .

The unknown variable does not appear as an exponent.

The only functions in which the unknown variable appears are LN, EXP, SQRT, LOG, ALOG, LNP1, and EXPM1.

Note: When you are solving for a variable which is raised to power, there may be more than one solution. This may happen if the power is a positive even integer. However, if calculating device 100 can solve your formula directly, it will find only one of the solutions. For example, if you type in the formula:

$A2=4$ and solve for A, calculating device 100 will rearrange your formula as

A=SQRT(4)

and calculate the answer to be 2. If you want calculating device 100 to choose another solution (in the above example it is −2) then put a minus sign before the quantity that is being raised to a power. In the above example, if you want the other solution type in the formula as:

$$(-A)2=4$$

calculating device 100 will then rearrange your formula as $$A=-SQRT(4)$$

and calculate the answer to be $-2$.

Methods for using a calculating device to directly solve equations is well known, for instance see *Computer Algebra* EUOROCAM '82, *European Computer Algebra Conference Marseille, France*, April 1982, edited by Jacques Calmet, Springer-Verlag Berlin Heidelberg N.Y. (esp. p. 111).

NUMERICAL SOLUTIONS IN SOLVE

If the solver is not able to isolate the unknown variable, it can not provide a direct solution. In these cases, the solver automatically starts to search for a solution numerically. Calculating device 100 uses a very sophisticated trial and error method to try to find a solution for the unknown. This involves searching for the answer by making a set of estimates, seeing how close they are to a solution, and then making another set of estimates. When the solver is searching for an answer numerically, calculating device 100 displays the current estimates. If those estimates don't appear to be proceeding towards your guess of what the answer should be, you may want to halt the numerical process, enter your own guesses, and then restart the search. Using calculating devices to find iterative solutions to equations is well known, see for instance, *Numerical Methods*, Germund Dahlquist, Ake Bjorck, Prentice-Hall Inc., Englewood Cliffs, N.J., 1974, (esp. pages 227-243).

HALTING THE NUMERICAL SEARCH

Whenever calculating device 100 is displaying a series of estimates, the numerical search is taking place. You can halt the search at any time by simply pressing any key once. Display 111 will display INTERRUPTED in line 1. The best estimate it has found so far is displayed in the calculator line.

IMPUTING GUESSES

Entering your own guesses serves two purposes. First, it can save time by telling the solver where to start searching. Secondly, if more than one solution exists, entering guesses can help the solver select the answer you want. You can enter one or two guesses. If you enter one guess, the solver makes the second guess. If you enter two guesses, calculating device 100 searches for a solution starting with your two guesses.

The closer your guesses are to the answer you want, the better chance the solver has of finding it. Furthermore, the solver works best if the answer you want is in between your two starting guesses.

For example, if you are confident that the solution is bigger than 3 and smaller than 5, then you should enter 3 and 5 as the starting guesses.

Guesses must be entered immediately before starting or restarting a calculation, after you've stored a value for every variable except the unknown variable. To enter two starting guesses:

Key in the value for the first guess and press the menu key corresponding to the unknown variable.

Key in the value for the second guess and press the menu key again.

To start (or restart) the search, press the menu key again.

For example, 45 [(A)] 90 [(A)] [(A)] enters the values 45 and 90 for the two starting guesses and starts the calculation. To enter one starting guess (letting calculating device 100 choose the second one), simply skip step 2 above.

If the both estimates are zero, calculating device 100 sets one estimate equal to 1. If both estimates are equal but non-zero, calculating device 100 increments one of the estimates by one in the seventh digit position. If the increment overflows, calculating device 100 decrements the estimate by one in the seventh digit position.

I claim:

1. A calculating device comprising:
    means allowing a user to enter a mathematical equation into the calculating device;
    display means for displaying a plurality of variables from the mathematical equation;
    a plurality of alphanumerical keys;
    a plurality of special keys;
    variable assignment means for assigning each displayed variable in the plurality of variables to a key from the plurality of special keys;
    data assignment means for assigning data to a variable in the plurality of variables when a key from the plurality of special keys is depressed after a sequence of keys from the plurality of alphanumerical keys is depressed; and
    solving means for solving the mathematical equation for a first variable in the plurality of variables when a first key from the plurality of special keys which is assigned to the first variable is depressed immediately after any key from the plurality of special keys is depressed.

2. A calculating device as in claim 1 wherein the display means includes a first line of display displaying the mathematical equation, and a second line of display displaying each variable from the plurality of variables.

3. A calculating device as in claim 2 wherein the display means additionally includes a third line of display displaying numbers assigned to each variable in the plurality of variables.

4. A calculating device as in claim 3 wherein numbers displayed in the third line of display are displayed adjacent to variables in the second line of display to which the numbers are assigned.

5. A calculating device as in claim 1 wherein the display means includes a scroll means for allowing a user to view a first set of variables from the plurality of variables separately from a second set of variables from the plurality of variables.

6. A calculating device capable of solving for variables in an equation, comprising:
    equation scanner means for scanning the equation, and extracting variables from the equation;
    displaying means for displaying the extracted variables;
    keyboard input means having a plurality of special keys and a plurality of numeric keys;
    numeric entry means for entering numerical data into the calculating device using the numeric keys;
    a plurality of solver keys, wherein each extracted variable is assigned to a solver key from the plurality of solver keys; and assignment means for assigning information to a first extracted variable when a first solver key from the plurality of solver keys to which is assigned the first extracted variable is depressed after a sequence of keys from the plurality of numerical keys is depressed.

7. A calculating device as in claim 6 additionally comprising:

solving means for providing a numerical solution for the equation in terms of the first extracted variable when the first solver key is depressed immediately after any solver key from the plurality of solver keys is depressed.

8. In a calculating device having a display and and a keyboard, an improvement comprising:

a plurality of solver keys on the keyboard;

a plurality of memory locations within the calculating device; and variable assignment means for assigning a first solver key in the plurality of solver keys to any memory location in the plurality of memory locations wherein when the first solver key is assigned to a memory location information in the memory location is stored and retrieved by operations on the keyboard which include depressing the first solver key.

9. An improvement as in claim 8 wherein the display includes:

labeling means for assigning a first label to the first solver key when that solver key is assigned to any memory location from the plurality of memory locations; and label display means for displaying the first label on the display.

10. In a calculating device, having a display, a memory and a keyboard, an improvement comprising:

a plurality of keys adjacent to the display;

storage means for storing an equation having variables in the memory, each variable having a name;

extracting means for extracting the variables from the equation; and display means for displaying labels containing the names of the variables, so that each name displayed is immediately adjacent to a key from the plurality of keys.

11. A calculating device capable of solving equations for variables in a plurality of equations, comprising:

equation scanner means for scanning equations, and extracting variables from the equations;

display means for displaying the extracted variables;

keyboard input means having a plurality of special keys and a plurality of numeric keys;

numerical entry means for entering numerical data into the calculating device using the numeric keys;

a plurality of solver keys, wherein each extracted variable is assigned to a solver key from the plurality of solver keys; and assignment means for assigning information to a first extracted variable when a first solver key from the plurality of solver keys to which is assigned the first extracted variable is depressed after a sequence of keys from the plurality of numerical keys is depressed.

12. In a calculating device having a display, a plurality of alphanumerical keys and a plurality of solver keys, a method for allowing a user to assign data to variables in a mathematical equation and to direct the calculating device to solve the mathematical equation, the method comprising the steps of:

(a) assigning each variable in the mathematical equation to a solver key from the plurality of solver keys so that to each solver key is assigned at most one variable;

(b) assigning data to a first variable in the mathematical equation when a first solver key to which the first variable is assigned is depressed immediately after a sequence of alphanumerical keys is depressed; and (c) solving the mathematical equation for a second variable when a second solver key to which the second variable is assigned is depressed immediately after a solver key from the plurality of solver keys is depressed.

13. A method as in claim 12 wherein step (a) includes the substep of:

(a.1) displaying a label for each variable within proximity of the solver key to which each variable is assigned.

14. In a calculating device having a display, a plurality of numerical keys and a plurality of solver keys, a method for allowing a user to assign data to variables in a mathematical equation, the method comprising the steps of:

(a) scanning the mathematical equation and extracting variables from the equation;

(b) assigning each variable in the mathematical equation to a solver key from the plurality of solver keys so that to each solver is assigned at most one variable; and (c) assigning data to a first variable in the mathematical equation when a first solver key to which the first variable is assigned is depressed immediately after a sequence of numerical keys is depressed.

15. A method as in claim 14 additionally comprising the step of:

(d) solving the mathematical equation for a second variable when a second solver key to which the second variable is assigned is depressed immediately after a solver key from the plurality of solver keys is depressed.

16. In a calculating device having a display, a memory, a plurality of numerical keys and a plurality of solver keys, a method for allowing a user to assign data to variables in a mathematical equation, the method comprising the steps of:

(a) storing the mathematical equation in the memory;

(b) scanning the mathematical equation and extracting variables from the equation;

(c) assigning each variable in the mathematical equation to a solver key from the plurality of solver keys so that to each solver key is assigned at most one variable; and (d) displaying a label for each variable within proximity of the solver key to which each variable is assigned.

* * * * *